United States Patent [19]

Shono et al.

[11] 4,171,888
[45] Oct. 23, 1979

[54] FINDER OPTICAL SYSTEM FOR A SINGLE LENS REFLEX CAMERA

[75] Inventors: Tetsuji Shono, Kawagoe; Michiro Oishi, Tokyo, both of Japan

[73] Assignee: Asahi Kogaku Kogyo Kabushiki Kaisha, Tokyo, Japan

[21] Appl. No.: 870,710

[22] Filed: Jan. 19, 1978

[30] Foreign Application Priority Data

Feb. 28, 1977 [JP] Japan .................................. 52/21717

[51] Int. Cl.² ............................................ G03B 19/12
[52] U.S. Cl. .................................... 354/155; 354/225; 354/53
[58] Field of Search ............... 354/155, 152, 219, 224, 354/225, 53–56

[56] References Cited

U.S. PATENT DOCUMENTS

| | | | |
|---|---|---|---|
| 4,021,823 | 5/1977 | Miyata | 354/225 |
| 4,113,354 | 9/1978 | Yamasita | 354/152 |

FOREIGN PATENT DOCUMENTS

| | | | |
|---|---|---|---|
| 208251 | 5/1957 | Australia | 354/224 |
| 983624 | 6/1951 | France | 354/155 |

*Primary Examiner*—L. T. Hix
*Assistant Examiner*—Shelley Wade
*Attorney, Agent, or Firm*—Sughrue, Rothwell, Mion, Zinn and Macpeak

[57] ABSTRACT

A Kepler telescope type optical finder system for an SLR camera comprises a simple and compact prism having a generally wedge shape as contrasted with finder optical systems using surface mirrors or pentaprisms. The prism may be shaped so that the angle formed by the incident optical axis thereto and the emitting optical axis therefrom is smaller than 90° in order to further miniaturize the overall size of the camera. In this case, an additional wedge-shaped prism is inserted between the first focal plane of the optical system and the prism in order to reduce the chromatic aberration. The additional wedge-shaped prism may be provided with a surface formed into the surface of the condenser lens.

6 Claims, 11 Drawing Figures

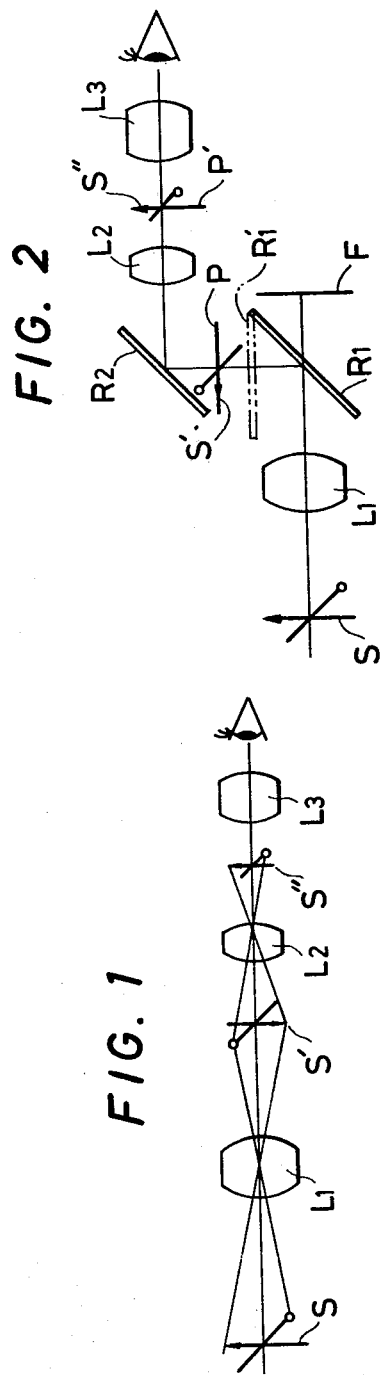
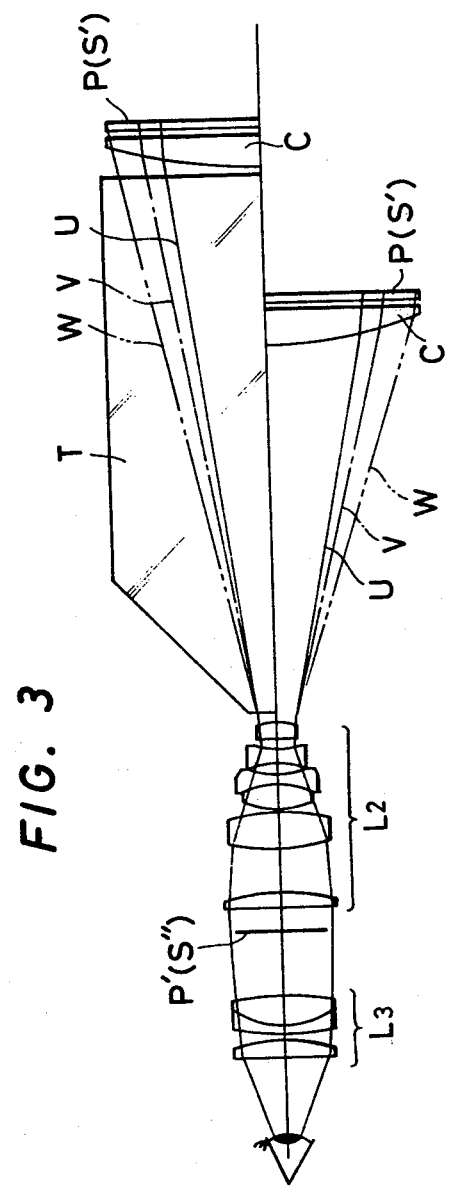

FINDER OPTICAL SYSTEM FOR A SINGLE LENS REFLEX CAMERA

BACKGROUND OF THE INVENTION

In a single lens reflext (SLR) camera, in order to observe the objective image, a movable mirror is disposed between a photographing lens system and a film plane so that the optical axis is turned up by a substantially right angle and a focal plate is disposed at the optical conjugative position with respect to the film plane. The image obtained through the photographing lenses is reflected by the movable mirror so that the image focused on the focal plate is an erect image in which the right and left sides are reversed. In an SLR camera having a square view field such as a 6×6 camera, it is practical to directly arrange eye piece lenses on the focal plate in order to observe the erect and reverse image through a viewfinder at the so-called waist level. However, because of the reverse image, it is very difficult to operate a camera having a finder optical system as used in a 6×6 square view field camera in especially longitudinal view photographing. Therefore, in an SLR camera having different lateral and longitudinal lengths of view field, such as a 35 mm camera, a halfsize camera and a 6×7 camera, it is requisite to observe the normal erect image through a viewfinder at the so-called eye level.

To provide a normal erect image, three types of finder optical system have been heretofore employed for an SLR camera. The first is the well known pentaprism finder system and is the type generally used in 35 mm SLR cameras. The second finder optical system replaces the image reversing surfaces of the pentaprism with two independent reflex mirrors, that is, the so-called porromirror. The size of this finder optical system is large and is now seldom used due to low image magnification ratio. The third finder optical system is a Kepler telescope. In this finder system, the image on the focal plate is once focused by the relay lenses and thereafter the image is observed through an eye piece. According to this sytem, it is sufficient to arrange an odd number of plane mirrors as reflex members after the focal plate in the finder optical system. Image reversing reflection surfaces are not required for this system. At first glance, these features appear to be attractive. However, when the finder optical system is, in truth, constructed, the distance from the focal plate to the relay lenses can not be easily shortened. The reason why is that if the length is shortened, generally the relay lenses tend to become large, the number of the relay lenses increases and there is maximum limit of visible feeling of the optical system.

SUMMARY OF THE INVENTION

The present invention provides an improved Kepler telescope type finder optical system wherein the optical length from the focal plate to the relay lenses can be elongated by means of a simple prism. The present invention provides a device which permits the length of the prism to be shortened. Light receiving elements for through the lens metering may be arranged so as to utilize the emitting surface of the prism. Display members in the finder optical system are arranged at the position corresponding to the second focal plane of the Kepler type telescope so that the display members in the finder are removed from the periphery of the focal plate. The present invention is a greatly improved optical finder system of the conventional Kepler-type telescope particularly adapted for practical use.

BRIEF DESCRIPTION OF THE DRAWINGS

The advantages of the invention will be better understood from the following description with reference to the accompanying drawings, in which:

FIG. 1 schematically illustrates the Kepler telescope;

FIG. 2 schematically illustrates the Kepler telescope type finder optical system;

FIG. 3 is a developed view of an embodiment of the Kepler telescope type finder optical system;

DESCRIPTION OF THE PREFERRED EMBODIMENTS

Figure 4:
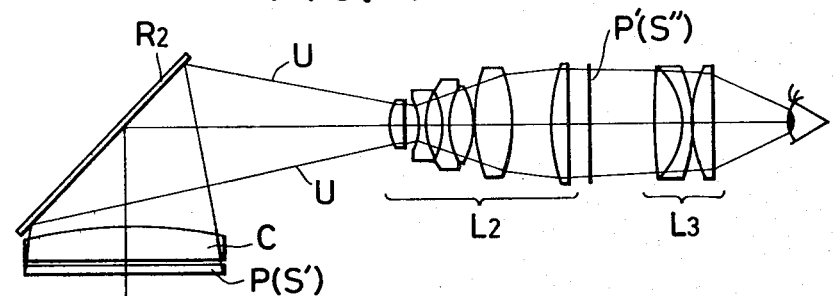
FIG. 4 is a schematic view of an embodiment of the finder optical system using a single reflex mirror.

Referring to the drawings, FIG. 1 illustrates a conventional Kepler type telescope which is the basic optical system of the present invention. In FIG. 1, the image of the object S is focused through the objective lens $L_1$ on a first focal plane as the inverted image S', and the normal erect image S" focused through the objective lens $L_2$ on a second focal plane is observed by use of eye piece lens $L_3$.

FIG. 2 illustrates the Kepler telescope type finder optical system wherein the image of the object is focused as an erect inverted image S' through a movable mirror $R_1$ on the first focal plane P whose position is optically conjugative with the position of the film plane F. The image S' is focused through the mirror $R_2$ and relay lens $L_2$ on the second focal plane P' as a normal erect image S" which is observed through the eye piece lens $L_3$. In a photographing operation, the movable mirror $R_1$ is raised up to the phantom line position $R_1$, and the film is exposed by operation of a focal plane shutter (not shown). The principles of the optical systems above mentioned are well known.

FIG. 3 is a schematic developed view of the Kepler telescope type viewfinder which is useful to illustrate the principles of the invention. The image S' focused through the objective lens system (not shown) is reflected by a movable mirror (not shown) and focused on a focal plate at the first focal plane P. The half portion of the image S' above the optical axis passes through a condenser lens C and a prism T toward relay lenses $L_2$, while the half portion of the image S' below the optical axis passes through the condenser lens C and the air space toward the relay lenses $L_2$. U, V and W designate peripheral light fluxes corresponding to short edges, long edges and diagonal lines of the view field, respectively. The difference in the length between the portions above and below the optical axis is due to the refraction index (n) of the above mentioned prism and the refractive index (1) of the air. That is, the upper and lower focal plates are positioned at the same optically conjugative position with respect to the relay lenses $L_2$. The image S' through the relay lenses $L_2$ is focused on the second focal plane P' at which the image S' again becomes the image S''. The image S'' is observed through an eye piece lenses $L_3$.

Considering for the moment only the lower half portion below the optical axis in FIG. 3, reference is first made to FIG. 4. The image focused by the objective lenses (not shown) is reflected by the movable mirror $R_1$ and is focused on a focal plate P as the image S' which is in turn focused through the condenser lens C, a mirror $R_2$ and relay lenses $L_2$ as the image S'' and observed through eye piece lenses $L_3$. In this optical systm, the above mentioned mirror $R_2$ is required to be large enough to prevent the peripheral light fluxes U of the short edges from being obstructed or blocked.

Again considering only the lower half portion below the optical axis in FIG. 3, reference is next made to FIG. 5. The difference between the optical system shown in FIG. 4 and this optical system is that this system has the additional mirrors $R_3$ and $R_4$. In this optical system, the mirrors $R_2$, $R_3$ and $R_4$ are required to be large enough to prevent the peripheral light fluxes U of the short edges from being obstructed or blocked.

Figure 5:
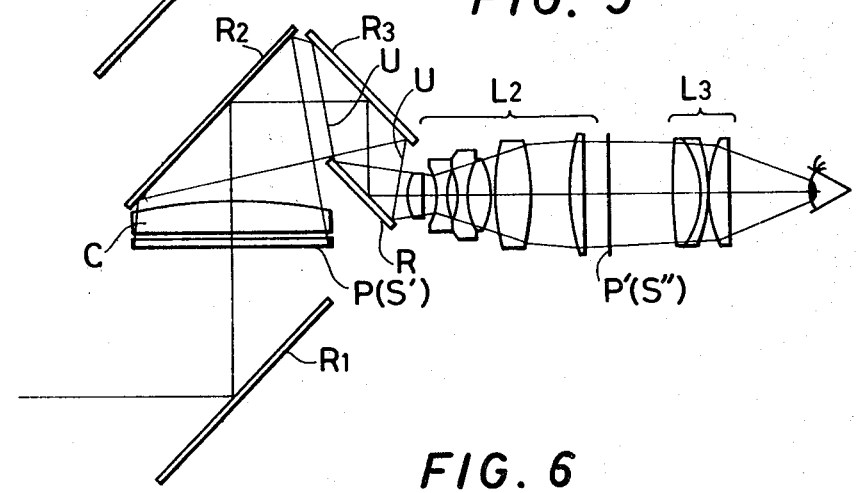
FIG. 5 is a schematic view of an embodiment of the finder optical system using three reflex mirrors.
Figure 6:
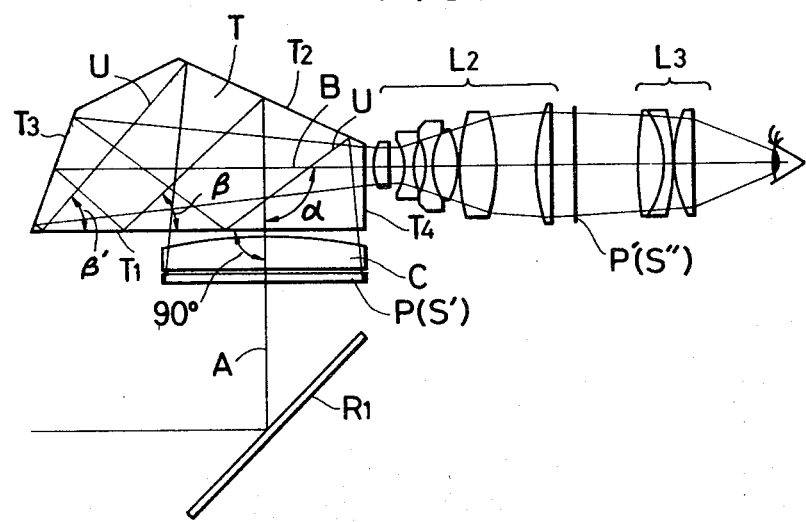
FIG. 6 illustrates a configuration of the prism used in the present invention.

In contrast to the optical systems shown in FIGS. 4 and 5, FIG. 6 shows an optical system corresponding to the upper half portion above the optical axis in FIG. 3 and illustrates the basic form of the prism used according to the invention. The image through the objective lenses (not shown) is reflected by a movable mirror $R_1$ and is focused on a focal plate P as an image S'. The image S' passes through a condenser lens C and that incident surface $T_1$ of a prism T which is perpendicular to the optical incident axis A, is reflected on the first reflection surface $T_2$ forwardly (to the operator), is totally reflected on the above mentioned incident surface $T_1$, is thereafter reflected on the second reflecting surface $T_3$ backwardly, is emitted from emitting surface $T_4$ which is perpendicular to an emitting optical axis B, is passed through relay lenses $L_2$ and is focused as a image S'' which is observed through eye piece lenses $L_3$. The angle formed by the above mentioned incident optical axis A and emitting optical axis B is established at 90°. The angle $\beta$ formed by the reflex optical axis from the above mentioned first reflection surface $T_2$ to the above mentioned incident surface $T_1$ is determined by the severe condition of an angle $\beta'$ formed by the peripheral light flux U and the above mentioned incident surface $T_1$ and the above mentioned refractive index n of the prism T as determined by the following equation:

$$\beta' \leq 90° - \sin^{-1}(1/n)$$

If n = 1.51633 (optical glas BK-7), and
$\beta' - \beta = 7°30'$ = the angle formed by the optical axis in FIG. 3 and the peripheral light flux U, then
$\beta = 41°$, or more precisely, $\beta \leq 41°15'$.

Comparing FIG. 6 with FIGS. 4 and 5, though FIG. 4 shows a simpler optical system, the length from the focal plate P to the relay lenses $L_2$ is long with the result that the length from the front to the rear of the camera becomes unduly long. Furthermore, since the level of the optical axis of the relay lenses $L_2$ and the eye piece lenses $L_3$ is high, the length from the bottom to the top of the camera also becomes unduly long. Though the size of the optical system in FIG. 5 is relatively small or compact in comparison with FIG. 4, the optical system in FIG. 5 has the following disadvantages:

(a) The distance from the focal plate to the relay lenses is long.
(b) The amount of the light is reduced to about $0.88^3 = 68\%$ when the reflex mirrors $R_2$, $R_3$ and $R_4$ are made using aluminum evaporation techniques, because the mirrors $R_2$, $R_3$ and $R_4$ are surface reflection mirrors.
(c) If the function of the mirrors $R_3$ and $R_4$ can be substituted with that of a prism, the reduction of the amount of the light is not so great. However, in such a substitution the length from the focal plate P to the relay lenses $L_2$ is long so that the total length from the front to the rear of the camera is unduly long.
(d) It is difficult to align the actual optical axis with the designed optical axis, since the mirrors $R_2$, $R_3$ and $R_4$ are supported or fixed, respectively.

In FIG. 6, the level of the height of the optical system shown is low in comparison with that shown in FIGS. 4 and 5 and the amount of the light through the prism T is $0.94 \times 1 \times 0.94 = 88(\%)$ when the reflection surfaces $T_2$ and $T_3$ are made by aluminum evaporation. The height of the finder optical system has great influence upon the total size of the camera, and this value of light is greater than the values of the optical systems in FIGS. 4 and 5 by about 20%. In FIG. 6, the distance from the focal plate P to the relay lenses $L_2$ is remarkably shortened so that the total length from the front to the rear of the camera can be shortened. In addition, it is easy to identify the optical axis with the designed optical axis by accurately machining the prism T because the reflex surfaces are positioned in the prism T. In the machining of the prism T, the angles of the reflection surfaces $T_1$, $T_2$ and $T_3$ only are important or critical and there is no back surface as in the conventional optical system. Therefore, the machining is quite easy.

Figure 7:
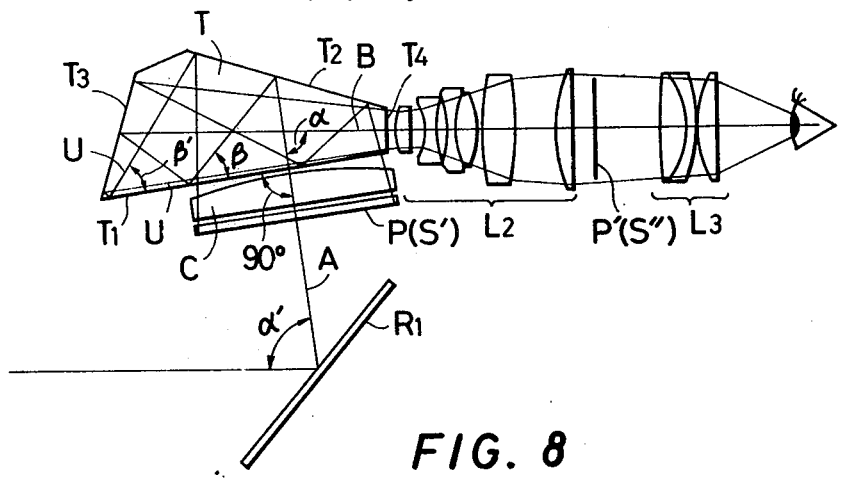
FIG. 7 illustrates the miniaturization of the prism according to the present invention.

FIG. 7 illustrates the miniaturiation of the prism and corresponds to the upper portion of the view field with respect to the short edge thereof as in FIG. 6. In FIG. 7 the image (not shown) focused through the photographic lens is reflected on a movable mirror $R_1$ at the reflecting angle $\alpha'$, is focused on a focal plate P, passes through a condenser lens C, is transmitted through that incident surface $T_1$ of a prism T which is perpendicular to the incident optical axis A, is reflected on the first reflex surface $T_2$ forwardly, is totally reflected on the above mentioned incident surface, is reflected on the second reflex surface $T_3$ backwardly, is thereafter emitted from an emitting surface $T_4$, passes through relay lenses $L_2$ and refocused as the image S'' which is observed through eye piece lenses $L_3$. The angle $\alpha$ formed by the above mentioned optical axis A and the above mentioned emitting axis B is equal to the above mentioned angle $\alpha'$ and the angle $\alpha$ is a right angle minus a difference between the angle $\beta$ formed by the reflex optical axis from the first reflex surface $T_2$ to the above mentioned incident surface $T_1$ and the angle $\beta'$ formed by the peripheral light flux U and the above mentioned incident surface $T_1$, that is, $\alpha = 90° - (\beta' - \beta)$. As in the FIG. 6, $\alpha$ is 82°28', from the relation that $\beta' - \beta = 7°32'$. As the result, the peripheral light flux U passing from the above mentioned second reflex surface $T_3$ to the above mentioned incident surface $T_1$ is parallel with the above mentioned incident surface $T_1$. In comparison with the optical system in FIG. 6, the size of the prism T in FIG. 7 is small or compact. The above mentioned angle $\beta$ is established at 41° as in FIG. 6. Though the angle $\beta$ in FIG. 7 is equal to that in FIG. 6, the angle formed by the horizontal optical axis and the reflex surface $T_2$ can be decreased. In other words, by decreasing from 90° the above mentioned angle $\alpha$ formed by the above mentioned incident axis A and the above mentioned emitting optical axis B, the configuration of the above mentioned prism T is greatly miniaturized as compared with FIG. 6.

Figure 8:
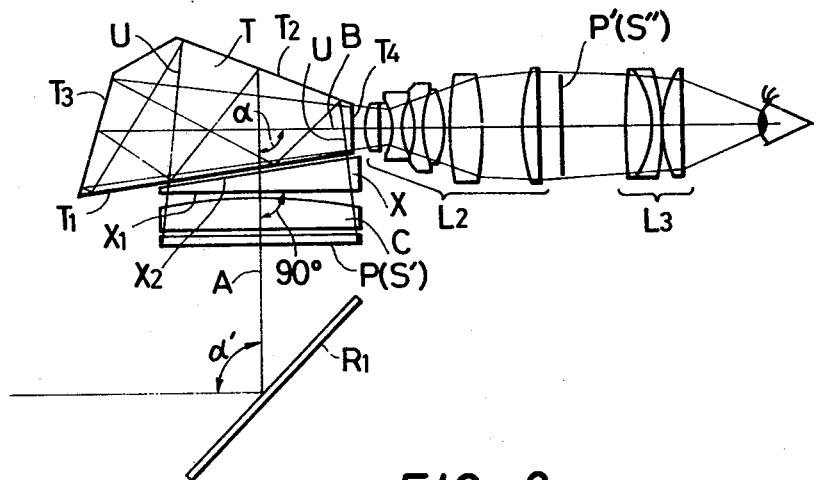
FIG. 8 illustrates the miniaturization of the prism by use of a wedge-shaped prism.

FIG. 8 illustrates the miniaturization of the finder optical system by use of a wedge-shaped prism and corresponds to the short edge of the view angle above the optical axis shown in FIG. 3. An image through the photographing lens system is reflected on a movable mirror $R_1$ at a reflex angle 90°, is focused on a focal plate P as an image S', passes through a condenser lens C into a wedge-shaped prism having an incident surface $X_1$ perpendicular to the incident optical axis A. An emitting surface $X_2$ of the wedge-shaped prism X is parallel with an incident surface of a prism T. The incident surface $T_1$ is inclined, i.e., not a right angle, with respect to the above mentioned optical axis as shown in FIG. 8 in order to facilitate the total reflection. As a result, chromatic aberration, which would otherwise be generated but for the fact that the light which emits from the above mentioned emitting surface $X_2$ becomes the incident light to the incident surface $T_1$, is compensated for. The light is reflected on the first reflex surface $T_2$ forwardly (with respect to the operator), is totally reflected on the incident surface $T_1$, is reflected on the second reflex surface $T_3$ backwardly, is emitted from an emitting surface $T_4$ through relay lenses $L_2$ and is focused as an image S'' which is observed through eye piece lenses $L_3$.

The optical system of FIG. 8 differs from that shown in FIG. 7 in that the angle $\alpha$ formed by the above mentioned incident optical axis and the above emitting axis B is 90°, the above mentioned wedge-shaped prism is provided and the above mentioned first reflex surface is inclined slightly in FIG. 8. The finder optical system shown in FIG. 8 is somewhat larger than that shown in FIG. 7. However, the finder optical system shown in FIG. 7 has such disadvantages that, for example, in observing the optical system at the waist level with dismantling the prism T from the camera, it is impossible to observe it downwardly and it is difficult to mount the above mentioned focal plate P and the condenser lens C on the camera since the incident optical axis A is not reflected perpendicularly. Therefore, the better finder optical system should be selectively used in view of the advantages and the disadvantages of the finder optical systems shown in FIGS. 7 and 8. If the above mentioned wedge-shaped prism X is omitted from the finder optical system shown in FIG. 8, since the above mentioned incident surface $T_1$ is not perpendicular to the above mentioned incident optical axis A, chromatic aberration is generated in the finder image and at the same time, since the upper length of the peripheral light U is different from the lower length thereof in the view field, the view field which should be observed as a rectangular shape is observed as a trapezoid shape.

Figure 9:
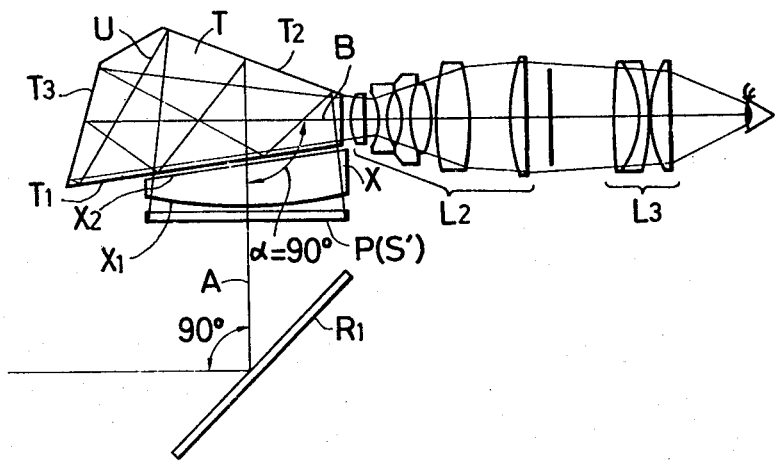
FIG. 9 shows the condenser lens and the wedge-shaped prism combined in a single optical element.

FIG. 9 shows the finder optical system in which the wedge-shaped prism and the condenser lens in FIG. 8 are substituted by a single specific condenser lens. Therefore, in FIG. 9, the above mentioned condenser lens C is omitted and the incident surface $X_1$ of the wedge-shaped prism X is deformed into the condenser lens surface. For this reason, it is possible to make a finder optical system in FIG. 9 in comparison with FIG. 8 with resulting low cost, to miniaturize it and, further, to reduce a ghost in the finder image due to the reduction of surfaces through which the light passes.

Figure 10:
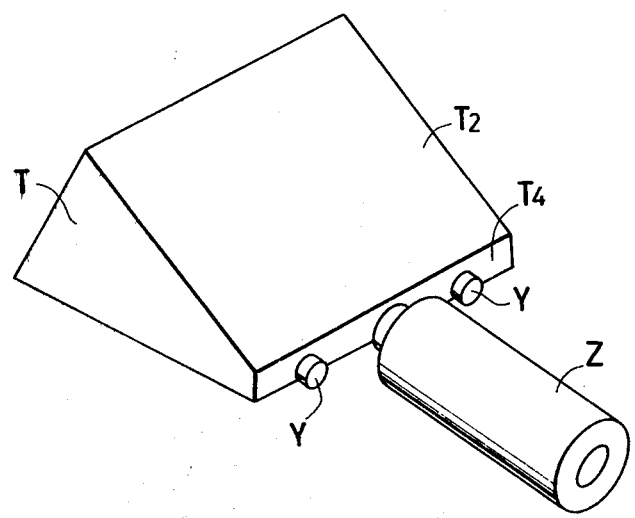
FIG. 10 shows the arrangement of the light receiving elements for through the lens (TTL) metering.

FIG. 10 shows an arrangement of light receiving elements. The space in which the light receiving elements Y are arranged in order to accomplish the through the lens (TTL) metering is sufficiently wide on both sides of a sleeve Z in which relay lenses and eyepiece lenses are inserted because emitting surface $T_4$ of an prism T is extremely wide in its lateral direction. In FIGS. 6, 7, 8 and 9, it is possible to dispose the light receiving elements Y at the same level as the above mentioned emitting optical axis. For this reason, it is possible to use light receiving elements Y which have uniform light receiving distribution in its vertical direction.

Figure 11:
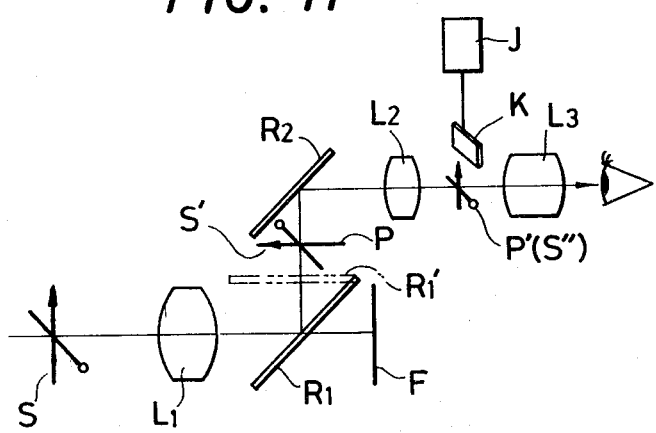
FIG. 11 is a schematic view of an embodiment of the viewfinder according to the present invention wherein the display members are disposed in the second focal plane.

FIG. 11 shows a finder optical system wherein display members in the finder are disposed at the second focal plane of the Kepler telescope type finder optical system. A control circuit J and light emitting diode (LED) display plate K are added to the finder optical system shown in FIG. 2. Heretofore, display members in the finder for an SLR camera, for example, a shutter speed indicator, an aperture indicator, or an exposure metering indicator, in the form of an LED display, a liquid crystal (LCD) display and a warning signal plate or the like, have been disposed around the focal plane P or at the optically conjugative position with the above mentioned focal plane P by relaying the light by use of a small prism or the like. It is therefore often difficult to observe the display members in the finder due to the visual angle of the above mentioned focal plane P and those of the above mentioned display members in the finder. However, in the Kepler telescope type finder optical system, there is the second focal plane P' of the relay lens $L_2$ in addition to the above mentioned focal plane P, and it is possible to dispose the display members in the finder system at the second focal plane. In FIG. 11, the shutter speed and the like are displayed on the above mentioned LED display plate K by LED's and, therefore, the display is observed through the eyepiece lens $L_3$. Since the LED display is positioned on the above mentioned second focal plane, the object S is perfectly identified with the object image S''. For this reason, even if the observing position of the operator is moved, the above mentioned object image S'' is not deviated from the LED display. Of course, with respect to any of the display members in the finder, the above mentioned effect is obtained. Further, since it is unnecessary to arrange the display members in the finder at the focal plane P, the periphery of the focal plane P can be simply designed. In FIGS. 6-9, the above mentioned display members in the finder are disposed at the focal plane on which the image S'' is focused. Furthermore, since the eye piece lenses $L_3$ function to enlarge the size of the above mentioned object image S'' to substantially the same size as the image S', even if the above mentioned display members in the finder are relatively small, it is possible to observe them with sufficiently large size.

As mentioned above, in the present invention, for the purpose of elongating the optical length from the focal plate P to the relay lenses $L_2$ of the Kepler telescope type finder optical system for SLR cameras a simple and small prism T which has an incident surface $T_1$ reflex surfaces $T_2$ and $T_3$ and an emitting surface $T_4$ is used, thereby largely improving the conventional finder optical system using surface mirrors. The finder optical system of the present invention is smaller and brighter than the conventional one and is superior to the conventional one in assembly. Further, in order to greater miniaturize the configuration of the prism T, the present invention provides a finder optical system wherein an angle α formed by the incident axis A and the emitting optical axis B of the prism is smaller than 90°, another finder optical system wherein a wedge-shaped prism is inserted between the focal plane P and the prism T in order to reduce the chromatic aberration which is generated in the smaller prism T wherein the incident surface $T_1$ is not perpendicular to the incident optical axis A, and a further finder optical system wherein the incident surface $X_1$ of the wedge-shaped prism X is formed into the surface of the condenser lens, respectively. In addition to the above mentioned finder optical systems, the present invention provides a specific optical arrangement wherein light receiving elements Y are disposed on the rectangular emitting surface $T_4$ of the prism T for the TTL metering, the display members K in the finder are disposed at the position corresponding to the second focal plane of the Kepler telescope, and the display members K in the finder are omitted from the focal plane P thereby permitting a simple construction of the periphery of the focal plane P.

Additionally, in FIG. 3, there are many modifications, for example, that in order to further miniaturize the finder optical system, a mirror may be disposed in front of or to the rear of the relay lenses $L_2$ and eye piece lenses $L_3$ thereby to deviate the optical axis and permit the adjustment of the visual angle, or the eye piece lenses may be moved forwardly or backwardly, or the condenser lens which is provided for the purpose of enhancing the brightness of the view field is omitted, or other modifications which will be readily apparent to those of ordinary skill in the art.

What is claimed is:

1. A Kepler telescope optical finder system for a single lens reflex camera wherein the photographing lens system of the camera forms the first objective lens of the Kepler telescope and having a focal plane coincident with the camera film plane, said camera having a movable mirror for deflecting the plane of focus of said photographing lens system coincident with a focal plate located at a position conjugate with that of said film plane, said optical finder system having a relay lens for focusing the image on said focal plate of a second focal plane and an eye-piece lens for viewing the image focused at said second focal plane, the improvement comprising a prism positioned between said focal plate and said relay lens, said prism having an incident surface, first and second reflex surfaces and an emitting surface and shaped so that the image focused on said focal plate enters said prism through the incident surface, is forwardly reflected by the first reflex surface, totally internally reflected by the incident surface, backwardly reflected by the second reflex surface and emitted from the emitting surface toward said relay lens.

2. The optical finder system as recited in claim 1 wherein the angle formed by the optical axis perpendicular to the incident surface of said prism and the optical axis perpendicular to the emitting surface of said prism is smaller than a right angle.

3. The optical finder system as recited in claim 1 wherein light receiving elements for through the lens metering are arranged in the vicinity of the emitting surface of said prism.

4. The optical finder system as recited in claim 1 wherein display members are positioned in said second focal plane.

5. The optical finder system as recited in claim 1 further comprising a wedge-shaped prism positioned between said focal plate and said first mentioned prism, said wedge-shaped prism having an incident surface which is perpendicular to the optical axis passing through said focal plate and an emitting surface which is parallel to the incident surface of said first mentioned prism.

6. The optical finder system as recited in claim 5 wherein the incident surface of said wedge-shaped prism is a surface of a condenser lens.

* * * * *